(12) United States Patent
Clemens

(10) Patent No.: US 6,678,239 B2
(45) Date of Patent: Jan. 13, 2004

(54) HERMETICALLY SEALED PACKAGE FOR OPTICAL MEDIA DISK

(75) Inventor: Philip M. Clemens, Fort Wayne, IN (US)

(73) Assignee: Flexplay Technologies, Inc., New York, NY (US)

( * ) Notice: Subject to any disclaimer, the term of this patent is extended or adjusted under 35 U.S.C. 154(b) by 0 days.

(21) Appl. No.: 10/056,290

(22) Filed: Jan. 25, 2002

(65) Prior Publication Data

US 2002/0162758 A1 Nov. 7, 2002

Related U.S. Application Data

(60) Provisional application No. 60/264,882, filed on Jan. 29, 2001.

(51) Int. Cl.[7] .......................... G11B 23/03; B65D 85/57
(52) U.S. Cl. ..................................... 369/291; 206/308.1
(58) Field of Search ............. 369/291; 206/308.1–308.3

(56) References Cited

U.S. PATENT DOCUMENTS

| 4,700,839 A | 10/1987 | Fujii | 206/444 |
|---|---|---|---|
| 4,886,162 A | 12/1989 | Ambrogio | 206/328 |
| 5,815,484 A | 9/1998 | Smith et al. | 269/275.1 |
| 6,011,772 A | 1/2000 | Rollhaus et al. | 369/286 |
| 6,349,823 B1 * | 2/2002 | Innis | 206/308.1 |

FOREIGN PATENT DOCUMENTS

| JP | 07041067 A | * 2/1995 | B65D/85/57 |
|---|---|---|---|
| JP | 11-334783 | 12/1999 | |
| WO | WO 9914748 A2 | * 3/1999 | G11B/7/26 |

OTHER PUBLICATIONS

International Search Report dated May 21, 2002 in PCT/US02/02259.

* cited by examiner

*Primary Examiner*—William Klimowicz

(57) ABSTRACT

A hermetically sealed package for an optical media disk includes an oxygen impermeable base and an oxygen impermeable cover layer superposed on the base. The base includes a central portion thereof spaced from the cover layer to form an enclosing chamber for the disk. The cover layer is sealed to the base by a circular seal defining a periphery of the enclosing chamber.

17 Claims, 7 Drawing Sheets

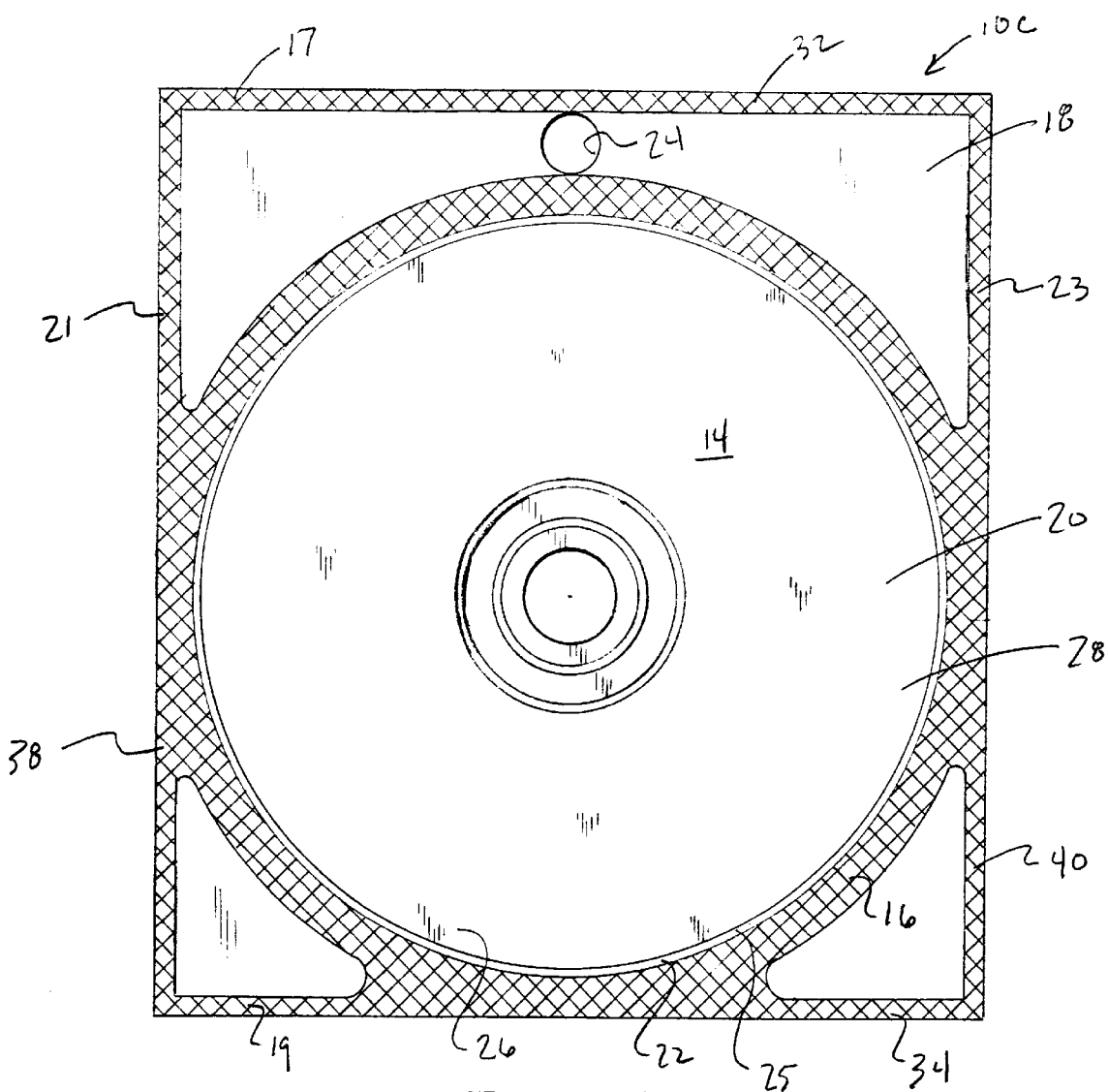
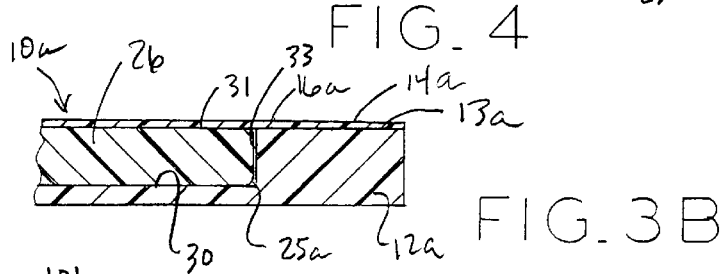
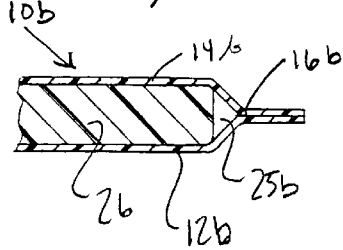

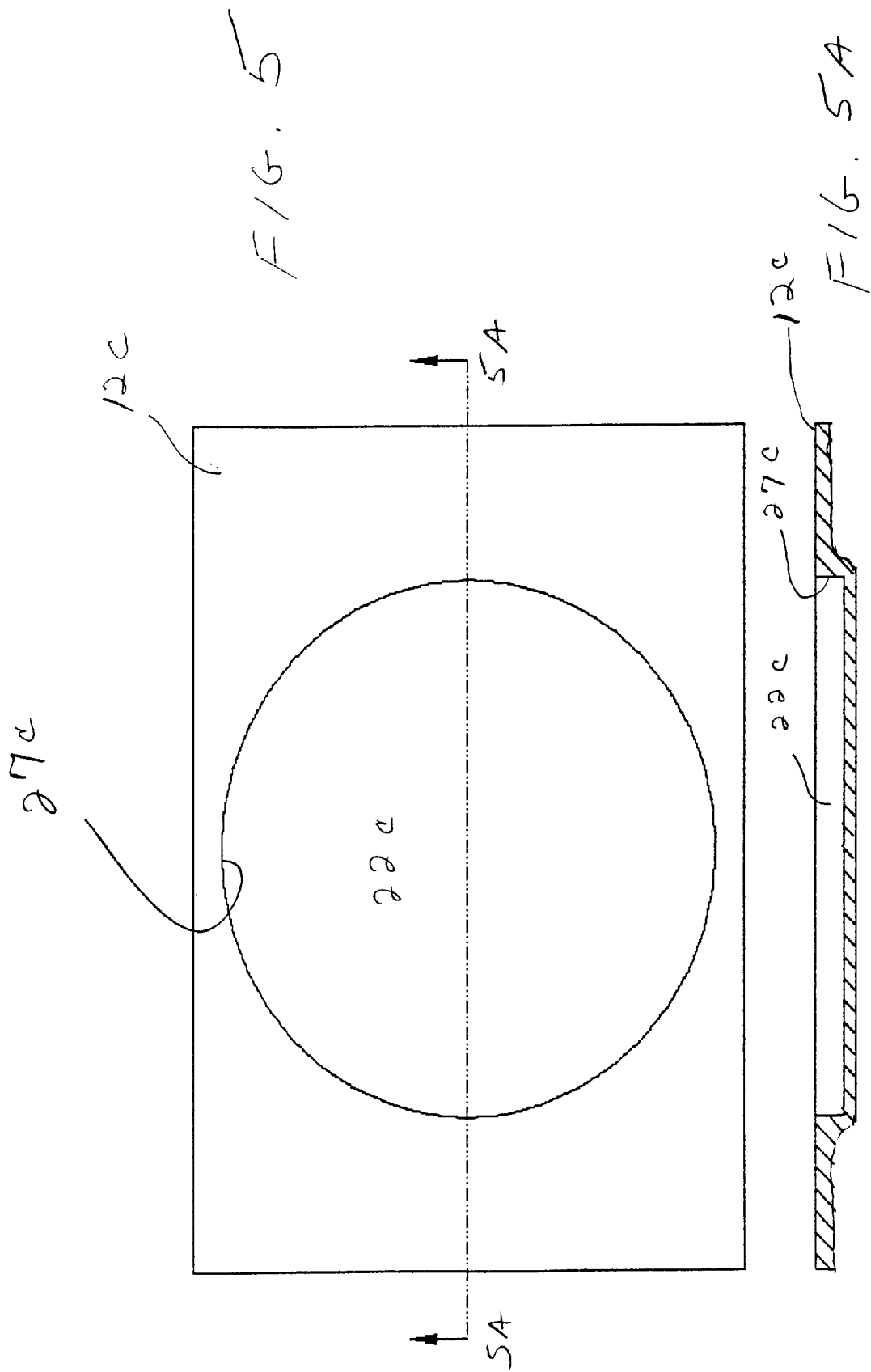

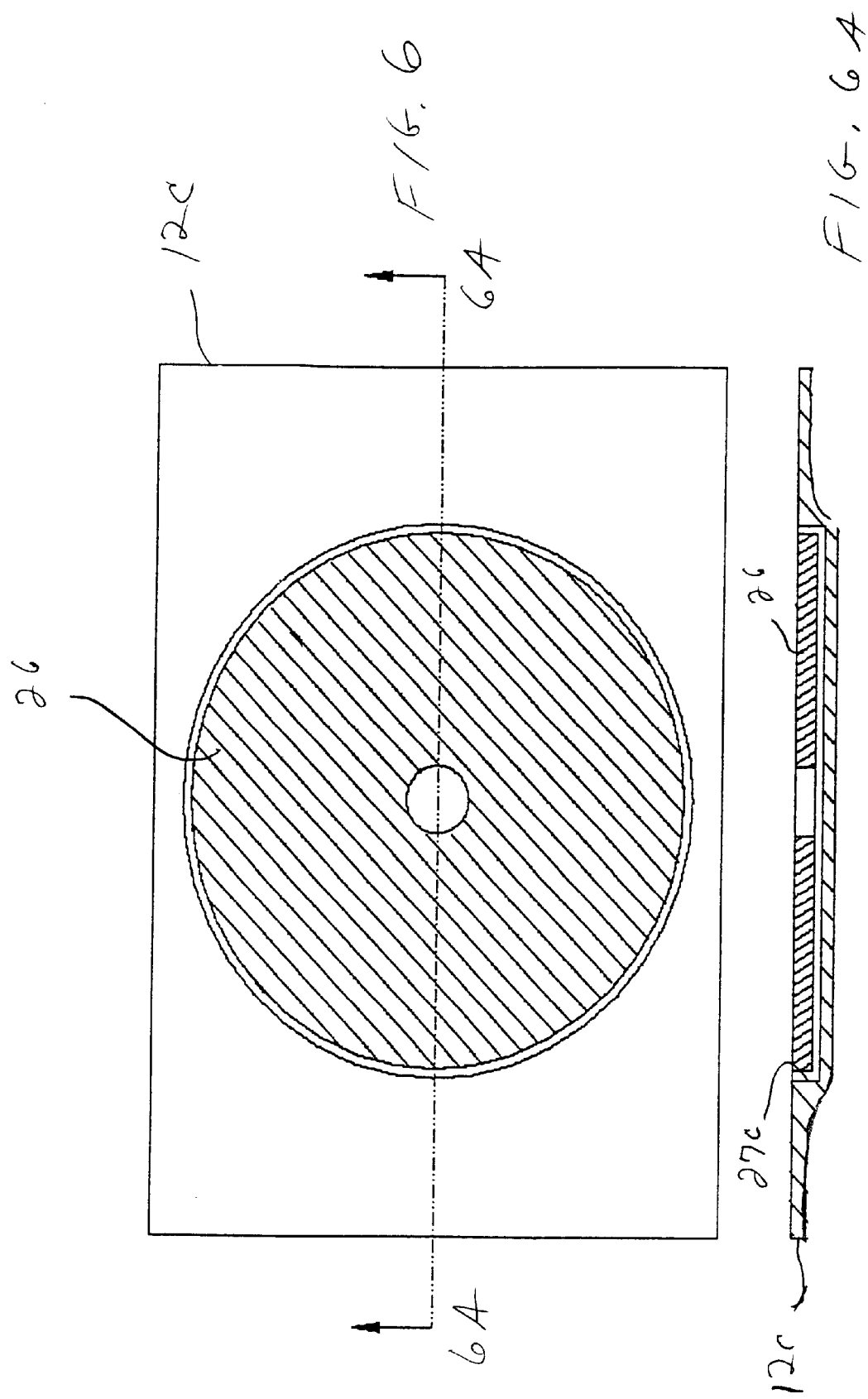

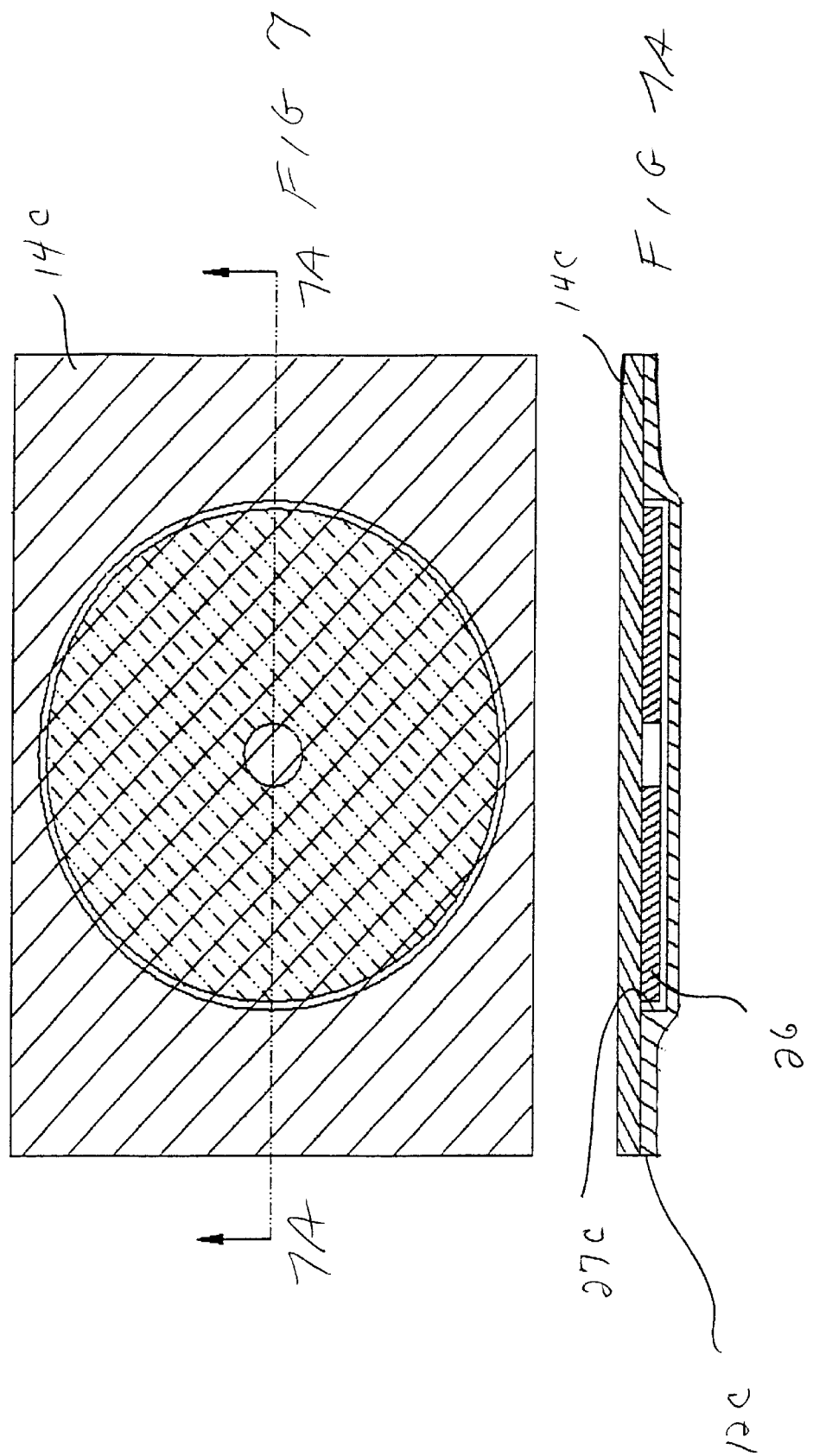

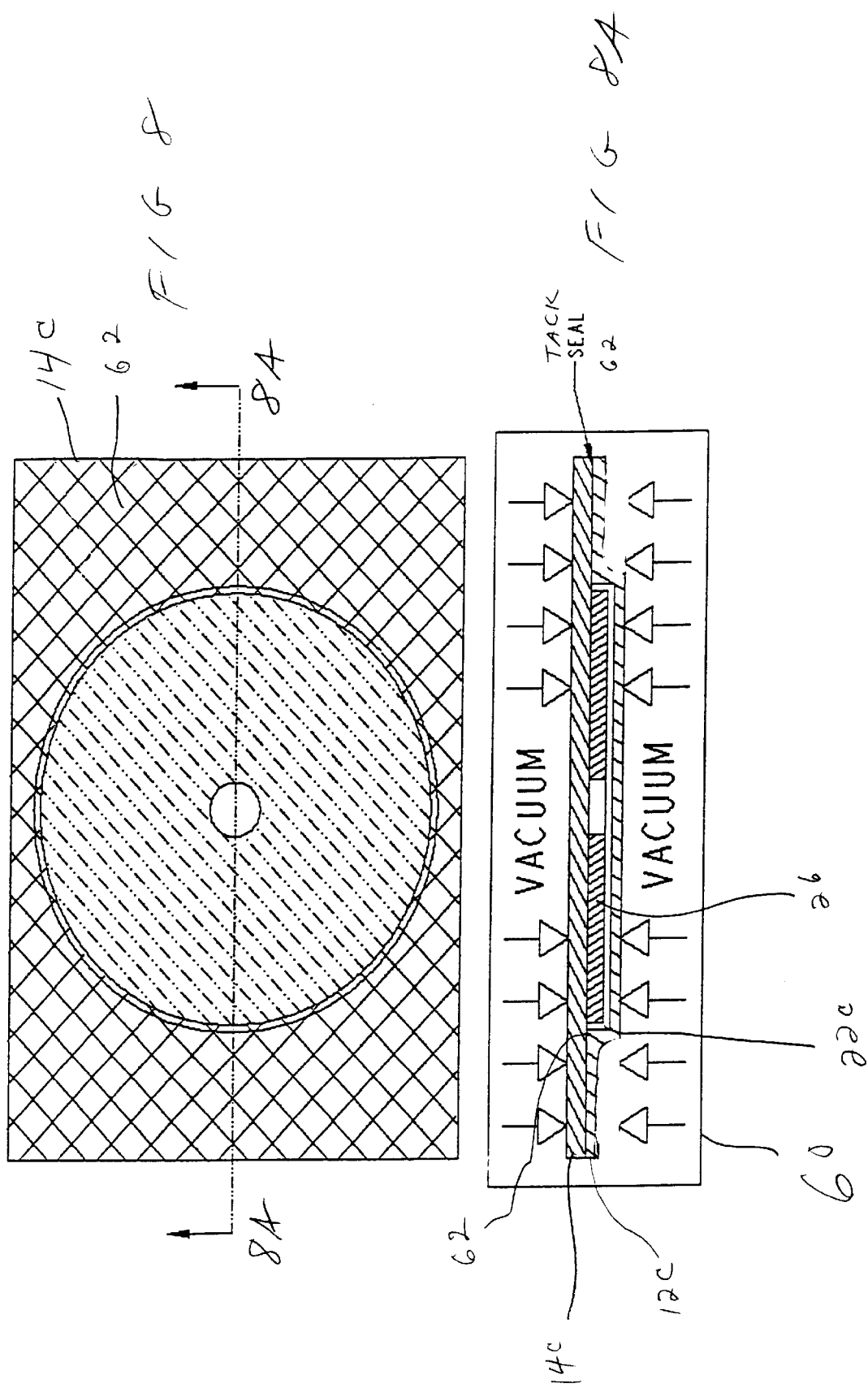

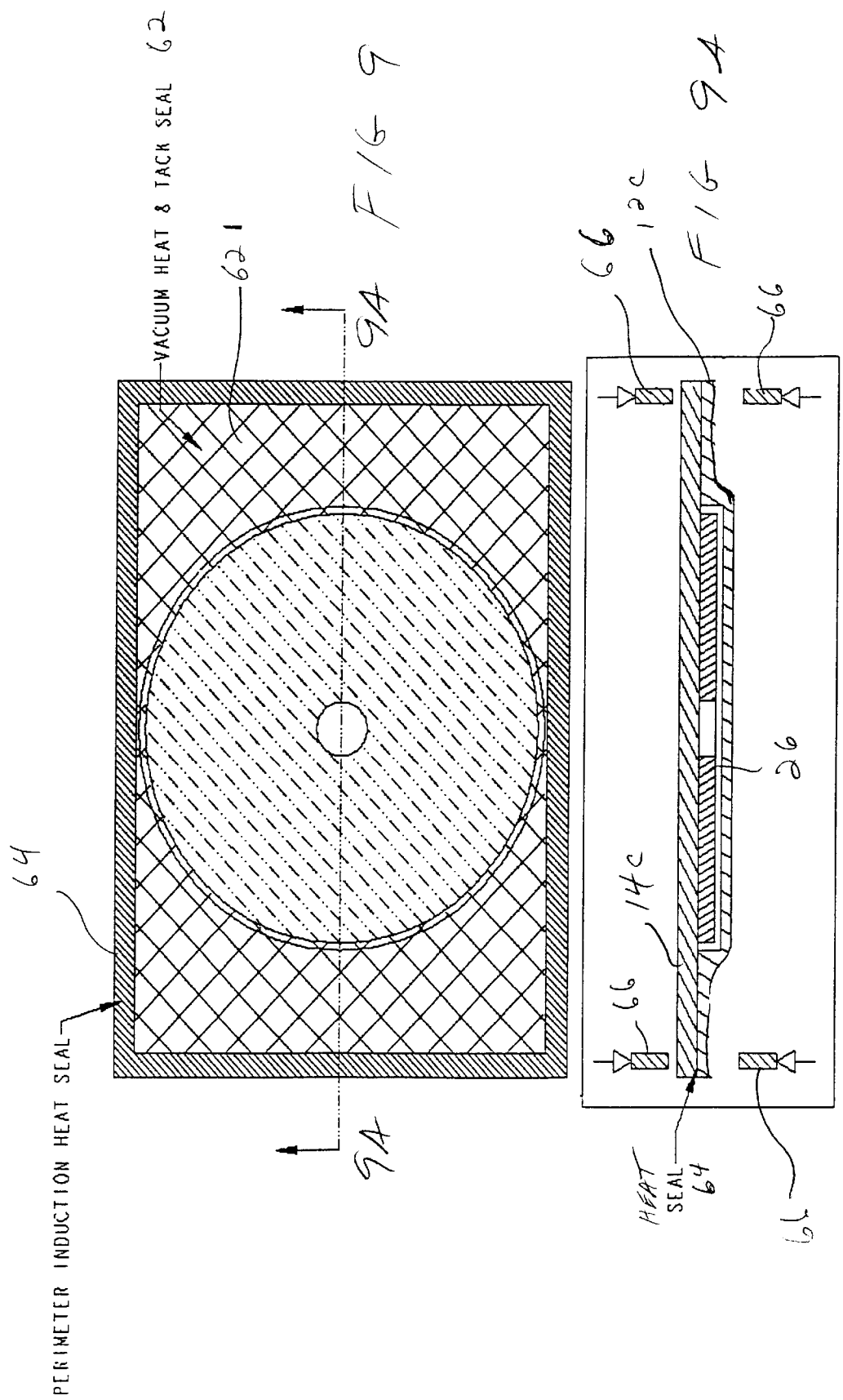

HERMETICALLY SEALED PACKAGE FOR OPTICAL MEDIA DISK

BACKGROUND OF THE INVENTION

1. Field of the Invention

The present invention relates generally to packaging containers, and more particularly, to packaging containers for optical media disks of the type that contain encoded information thereon accessible by a laser.

2. Description of the Related Art

The use of optical disks for the storage and eventual playback of music, video and other data is well known and in recent years drastic improvements have been made in the storage capability of these disks, as well as the quality of the product emanating from them. Recently, technological advances have been made to prevent misuse of the information contained on these disks. This misuse or "piracy" has become a significant concern to owners and assignees of copyrighted information contained on the disks.

In response to misuse, disks have been developed to include a shortened accessibility period which is activated by the consumer. The consumer may purchase one of these disks, access the information and subsequently dispose of the disk. The temporal nature of accessibility to information on the disk is intended to decrease misuse, e.g., copying. The temporal optical disk differs from known permanently accessible optical disks by having a reactive coating applied to the disk. The coating, once activated, allows the information to be read by a laser for a predetermined amount of time thereafter.

It is well known that optical disks may be rented, typically compact disks (CDs) and digital versatile disks (DVDs) are available through numerous outlets and rental businesses. However, one inconvenience associated with renting an optical disk is that it must be viewed shortly after being rented and returned not long thereafter. Further, many find returning the disk to be inconvenient and are often charged a late fee for delinquently returning the disk. As an alternative to following traditional disk rental practices it is envisioned that activatable disks may be purchased, accessed and disposed of at the consumers' leisure without the inconvenience of returning rental disks and paying late fees. One type of optical disk is activated by the consumer as he or she exposes the disk to oxygen from ambient air, e.g., oxygen reactive optical disk. Unfortunately, due to the unique requirements of the oxygen reactive disk a package is needed which will support, protect and contain the oxygen reactive disk over an extended period of time.

Packaging products in a reduced oxygen environment has been developed for use with perishable goods such as beef, for example, to improve the shelf life and prevent spoilage. It was determined that by diminishing the amount of oxygen in the package, the perishable goods lasted longer. In contrast to packaging food products such as meat, oxygen reactive optical disks demand an oxygen free environment. Also, the disk "outgases." Outgasing occurs when an amount of oxygen, retained in the material comprising the disk, is released subsequent to manufacturing the disk. Moreover, low oxygen food packages lack the structural integrity required to package and protect oxygen reactive disks.

U.S. Pat. No. 6,011,772 to Rollhaus et al. discloses providing an airtight enclosure surrounding both an optical disk and a barrier layer to enclose a moisture reactive disk. However, the enclosure is neither oxygen impermeable nor does it possess the integrity to be shipped, handled and displayed without the seal being disrupted. Furthermore, in addition to inner and outer layers comprising the enclosure, it is necessary to include an additional barrier layer overlaying the optical disk which is a significant additional cost.

What is needed is a package that addresses the unique requirements corresponding to an oxygen reactive optical disk, such as a package adapted to minimize residual oxygen gas to prevent the disk from being prematurely activated. Also, a package which may be handled, shipped and displayed without fear of disrupting the seal and allowing oxygen to permeate the package and prematurely initiate the activation process is desirable. Additionally, an optical disk package which may be manufactured and assembled with the optical disk without significant expense would be desirable.

SUMMARY OF THE INVENTION

The present invention overcomes the disadvantages of prior packages by providing a hermetically sealed package for an optical media disk, of simple construct, including an oxygen impermeable base and an oxygen impermeable cover superposed on the base. The cover includes a central portion thereof spaced from the base to form an enclosing chamber for the disk. The cover is sealed to the base by means of a circular seal defining a periphery of the enclosing chamber. The circular seal conforms to a periphery of the disk to thereby minimize the amount of space surrounding the disk. By minimizing the size of the enclosing chamber, the oxygen content of the chamber may be closely controlled to prevent an activating level of oxygen from reaching the disk.

If desired, the hermetically sealed optical media disk package may include at least one stiffening beam comprised of sealed base and cover portions. The stiffening beam is spaced apart from the enclosing chamber and increases the structural integrity of the package to thereby protect the circular seal and concomitantly provide an inexpensive package which will survive the rigors associated with shipping and handling.

An object of one form of the invention is to provide a hermetically sealed optical media information carrier package constructed of two oxygen impermeable layers which enclose an oxygen reactive optical information carrier and prevent a threshold amount of oxygen from entering the package and prematurely activating the carrier.

Another object of the present invention is to provide a hermetically sealed optical media disk package constructed of two layers which may be handled, shipped and displayed in accordance with the rigors associated with shipping and displaying optical disks.

These and other objects, advantages and features are accomplished according to the devices, assemblies and methods of the present invention.

BRIEF DESCRIPTION OF THE DRAWINGS

The above mentioned and other features and objects of this invention will become more apparent and the invention itself will be better understood by reference to the following description of embodiments of the invention taken in conjunction with the accompanying drawings, wherein:

FIG. 3B is an enlarged fragmentary view of a second embodiment of a hermetically sealed package for an optical media disk according to the invention, illustrating the base, cover layer and disk in section;

FIG. 3C is an enlarged fragmentary view of a third embodiment of a hermetically sealed package for an optical media disk according to the invention, illustrating the base, cover layer and disk in section;

FIG. 4 is a top view of a fourth embodiment of a hermetically sealed package for an optical media disk according to another form of the invention; and FIGS. 5–9A illustrate an exemplary method of manufacturing the hermetically sealed package according to one form of the invention.

Figure 1:
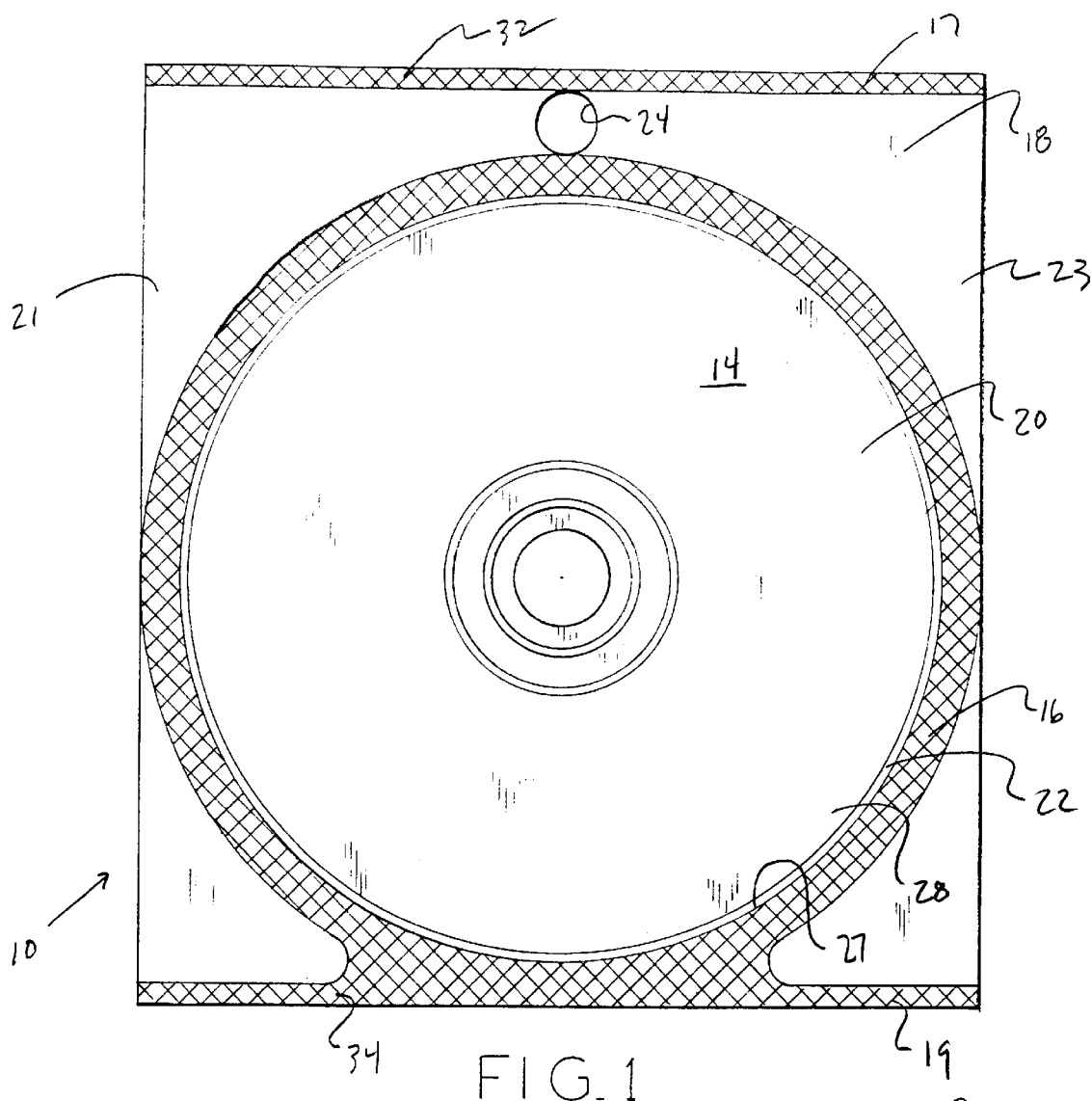
FIG. 1 is a top view of a first embodiment hermetically sealed package for an optical media disk according to one form of the invention.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE INVENTION

Figure 2:
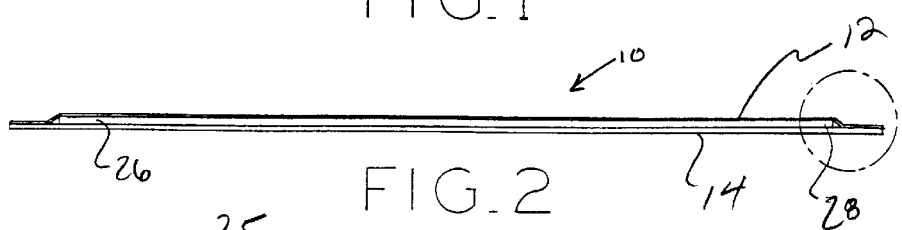
FIG. 2 is a sectional side view of the package of FIG. 1.
Figure 3A:
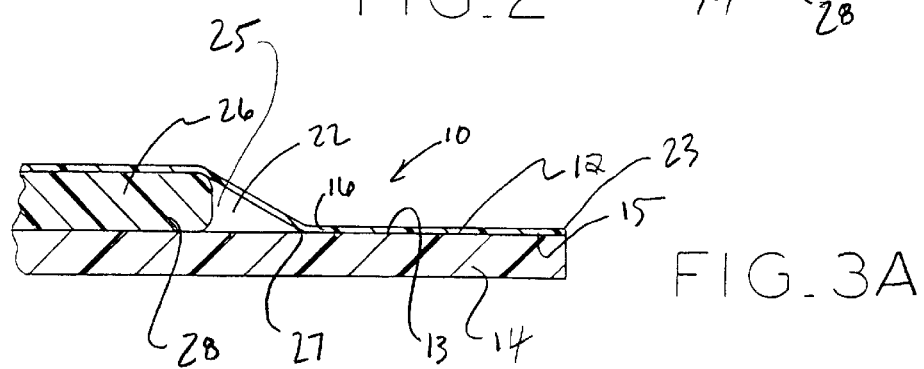
FIG. 3A is an enlarged sectional view of the encircled area of FIG. 2.

Referring to FIG. 1, a first embodiment of an optical media disk package is illustrated and includes rectangular base 12 (FIG. 2) overlaying rectangular barrier cover 14. Base 12 includes inner surface 13 abutting inner surface 15 of cover 14 (FIG. 3A). Package 10 includes an overall rectangular shape having four flush edges 17, 19, 21 and 23 formed by base 12 and cover 14. Base 12 and cover 14 are sealably attached to one another, through a heat sealing process for example, and form circular seal portion 16 that is centrally located on package 10. The term circular seal refers to that portion of the seal defining disk enclosing chamber 22. Alternatively, base 12 and cover 14 could be sealed together by a combination of a tack seal and heat seal wherein the heat seal is disposed at the outer perimeter of base 12 and cover 14. A further alternative is the use of an adhesive seal. Cover 14 is divided into outer margin 18 and central portion 20 by seal 16. Hermetically sealed disk enclosing chamber 22 is provided between base 12 and cover 14 and is located within central portion 20 of cover 14 (FIG. 3A). Enclosing chamber 22 encloses optical media disk 26 and includes circular opening 27 sized to be slightly larger than periphery 28 of optical disk 26. Between disk 26 and chamber 22 is space 25 having little or no ambient oxygen to prevent disk 26 form prematurely activating as hereinafter described. Optical media disk or optical disk 26 is enclosed within enclosing chamber 22. Package 10 is provided with mounting hole 24 extended through base 12 and cover 14 to accordingly mount package on a display hook (not shown).

In an exemplary embodiment, edges 17 and 19 of package 10 measure 5.3 inches and edges 21 and 23 measure 5.8 inches. Disk 26 may include a diameter of 4.724 inches and a thickness of 0.472 inches and opening 27 of enclosing chamber 22 may have a diameter of 4.8 inches, for example. Circular seal 16 may include a uniform cross sectional width of 0.25 inches and mounting hole may be 0.375 inches, for example.

Package 10 encloses optical media information carrier 26, although illustrated as an optical disk 26. Disk 26 is enclosed within chamber 22 and is typically made from a polycarbonate material such as LEXAN®, manufactured by the General Electric Company, New York 1 River Road, Schenectady, Mass. 12306. Disk 26 may be a compact disk (CD), digital versatile disk (DVD) or other carrier of information configured to be readable by a laser. In an exemplary embodiment, disk 26 is an oxygen reactive CD or DVD providing information accessible upon exposure to ambient oxygen and once exposed remaining accessible and readable for a predetermined, limited time. Such a disk is the subject of U.S. Pat. No. 5,815,484 to Smith et al. having a filing date of Dec. 24, 1996, the disclosure of which is expressly incorporated herein by reference. Although, other activatable disks are contemplated for use with the invention package 10, such as moisture reactive optical disks.

Referring to FIGS. 1, 2, 3A and 3B, cover 14 is comprised of a thin transparent material which is impermeable to gaseous oxygen. "Oxygen impermeable layer" is defined as a material having an oxygen transfer rate of about 0.00 cc per 100 $in^2$ per day. Base 12 may be made from a 0.003 to 0.010 inches thick laminate comprising PET/adh/50 ga CLEARFOIL®M/adh/3 mil Metallocene (hereinafter barrier laminate), the barrier laminate is available through Rollprint Packaging Products, Inc, Addison, Ill. 60101. CLEARFOIL® is also manufactured by Rollprint Packaging Products. Alternatively, barrier member may be comprised of a 3.6 mm scavenger/PET layer, such as CRYOVAC® OS 1000 (hereinafter scavenger laminate), manufactured by Cryovac, Duncan, S.C., 29334. Yet another alternative for base 12 may include a combination of the above two materials laminated together to form an oxygen scavenging layer that is substantially oxygen impermeable. The scavenger laminate is known to diminish residual oxygen which may have been trapped during assembly of package 10 or through outgasing of optical disk 26. It is preferred that the scavenger material itself be incorporated into the scavenger laminate to avoid requiring additional space within enclosing chamber 22 to accommodate for scavenger material. Alternatively, a thin scavenger device, such as a thin scavenger wafer, for example, may be independently placed within enclosing chamber 22 and base 12 may comprise barrier laminate.

As best illustrated in FIG. 3A, cover 14 is seen to be significantly thicker than base 12 such that cover 14 introduces a significant degree of support and rigidity to package 10. Base 12 may be made from substantially identical material as cover 14, although in the exemplary embodiment cover 14 is made from a polyester material, having a thickness of 0.005 to 0.015 inches for example, which is substantially oxygen impermeable and relatively low in cost. Alternatively, cover 14 may be a joined combination (forming one sheet of two separate materials) of barrier laminate attached to a cellulose backing, e.g., cardboard, to provide rigidity to the barrier laminate. The cardboard portion of cover 14 is located opposite of inner surface 13 of cover 14 (FIG. 3A). Alternatively, the barrier laminate may be substituted with the scavenger laminate and attached to the cardboard material with an adhesive. Cover 14 may comprise either transparent material or include a see-through window (not shown). The see-through window provided in the cover allows detection of premature activation of the optical disk since the readable surface of disk is configured to discolor when it is exposed to oxygen.

Referring to FIG. 1, circular seal 16 is shown and in the exemplary embodiment seal 16 is formed through a heat sealing process joining cover layer 14 to base 12 and concomitantly producing an oxygen impermeable seal.

Alternatively, it is envisioned that seal 16 may be formed as a vacuum tack seal through compression or by adhesive bonding of base 12 and cover layer 14.

In the exemplary embodiment shown, base 12 and cover layer 14 are further joined together at opposite edges 17, 19 to form a pair of stiffening beams 32, 34. Similar to seal 16, stiffening beams 32, 34 join base 12 and cover layer 14 to further reinforce package 10. Stiffening beams 32, 34 prevent cover layer 14 from inadvertently peeling away from base 12 and consequently disrupting circular seal 16. Further, it will be understood that seal 16 and stiffening beams 32, 34 provide structural reenforcement to package 10. In the exemplary embodiment stiffening beams 32, 34 are 0.125 inches wide. Notably, hole 24 is located between stiffened and reinforced seal 16 and stiffening beam 32 such that the package material surrounding hole 24 offers significant support, and no disruption of seal 16, when package 10 is suspended on a display hook (FIG. 1, display hook not shown).

It will be understood by those having ordinary skill that package 10 must encase disk 26, and additionally, prevent oxygen gas from entering package 10 and prematurely activating disk through ambient oxygen exposure. Moreover, once disk 26 is enclosed within package 10 seal 16 must withstand the rigors associated with shipping, handling and displaying package 10. Furthermore, care must be exercised not to allow ambient oxygen to reach disk 26 during assembly. To avoid premature activation of disk 26 during assembly, disk 26 may be enclosed within package 10 and the heat seal 16 formed in an oxygen free atmosphere. Alternatively, package 10 may be assembled on a high production in-line assembly machine (not shown) with oxygen purge capabilities adapted thereto. Preferably, a high production in-line machine adapted to receive rolled sheet stock is used to form package 10 and place disk 26 therein. The assembly machine joins base 12 and cover layer 14 in roll stock form, overlays the two rolled sheets, places optical disk 26 between the corresponding layers and subsequently forms seal 16 and stiffening beams 32, 34. The oxygen purge system introduces an inert gas, such as Nitrogen gas, into enclosing chamber 22 after disk 26 has been placed in enclosure 22. Circular seal 16 is then formed, closely conforming and completely encircling periphery 28 of disk 26 such that the amount of inert gas required to purge space 25 is minimized. Additionally, it is advantageous to select opening 27 of enclosing chamber 22 to be as small as possible, i.e., slightly larger than periphery of disk, since there is less seal surface and a smaller space 25 exposed to ambient oxygen and accordingly less opportunity for leakage to occur.

Even after enclosing chamber 22 has been properly purged of oxygen and disk 26 has been sealed in enclosing chamber 22, a small amount of residual oxygen remains. This small amount of oxygen is confronted by the scavenger material within base 12 of the exemplary embodiment of package 10 and accordingly banished from enclosure 22. Further, base 12 confronts any oxygen being outgased by disk material 26, ensuring a detrimental level of oxygen does not form in enclosing chamber 22. It is known that a small amount of oxygen will activate the optical disk within enclosing chamber 22. Thus, it may be seen that the oxygen transfer rate associated with base 12, cover layer 14 and seal 16, and additionally, the residual oxygen gas captured within enclosure 22 during assembly and due to outgasing of the disk 26 must be kept low. Moreover, those having ordinary skill in the art will understand that by providing the smallest enclosing chamber possible, the risk of residual oxygen gas exceeding the low level limit is reduced. In other words, the smaller the enclosure the less oxygen likely to be present.

Referring to FIG. 3B, shown is a second embodiment of a hermetically sealed optical media disk package. Certain elements include corresponding lettered reference numerals indicating that the element has been modified. Second embodiment package 10a differs from first embodiment package 10 in that base 12a is thicker than cover 14a and includes circular recess 30 sized slightly larger than periphery 28 of disk 26. Notably, top lateral surface 31 of disk 26 is substantially flush with inner face 13a of base 12a. Similar to seal 16 of package 10 being formed from the heat sealing of base 12 and cover layer 14, seal 16a is formed by heat sealing base 12a and cover layer 14 to form hermetically sealed package 10a. Further, it may be noted that outer wall 33 of recess 30 is sized to be slightly larger, e.g., a few thousands of an inch, than periphery 28 of disk 26 to provide the smallest possible space 25a.

Referring to FIG. 3C, shown is a third embodiment of a hermetically sealed optical media disk package. Third embodiment package 10b differs from first embodiment package 10 in that base 12b has been substituted with a material similar to that of cover barrier layer 14b. It will be understood by those having ordinary skill that the base 12b and cover layer 14b may comprise identical materials, such as barrier laminate or scavenger laminate, to avoid the costs associated with stocking two types of materials. Accordingly, to ensure package 10b includes a sufficiently rigid structure, stiffening beams may be introduced along each edge of the package to increase rigidity as hereinafter described (FIG. 4).

Referring to FIG. 4, shown is a fourth embodiment of a hermetically sealed optical media disk package. Fourth embodiment package 10c differs from first embodiment package 10 in that side edges 21, 23 comprising base 12 and cover layer 14, are joined and sealed together respectively forming stiffening beams 38, 40. Stiffening beams 38, 40 and adjacently positioned stiffening beams 32, 34 provide a secondary or back-up seal in case a portion of circular seal 16 fails. Furthermore, stiffening beams 38, 40 improve structural rigidity of package 10c. Stiffening beams 38, 40 substantially increase the structural integrity of package 10c and prevent base 12 and cover layer 14 from peeling apart at edges 21 and 23. Since the stiffening members provide increased structural integrity to the package it is envisioned that the thickness of the base and cover layer may be accordingly decreased as additional stiffening members are introduced to the package. It will be understood that significant expense may be avoided by utilizing less material to construct the base and cover layer.

Turning now to FIGS. 5–9, a possible method to manufacture the disk package shown in FIG. 1 is illustrated in diagrammatic fashion. FIGS. 5 and 5A show base web 12c, which may have a thickness of from 0.003 to 0.010 inches, having a pocket or chamber 22c formed therein by, for example, vacuum, pressure and heat in a manner well known in the art. Next, optical media disk 26 is dropped into pocket 27c at the next station (FIG. 6). As shown in FIGS. 7 and 7A, cover web 14c is transferred over the bottom web 14c; this assembly is then indexed forward into vacuum sealing chamber 60 (FIG. 8A) wherein the top and bottom webs with the disk contained in pocket 22c are tack sealed together by means of vacuum and heat as is conventional. The heat softens the plastic webs 12c and 14c sufficiently such that when the vacuum pulls the webs together they form a circular tack seal 62. The vacuum chamber also evacuates most of the oxygen from chamber 22c, and if desired, chamber 22c could be first purged with nitrogen prior to the tack sealing operation. As illustrated in FIGS. 9 and 9A, after the vacuum tack seal step is completed, the perimeter of the package is provided with a heat seal 64 by means of induction heat seal plates 66.

The disclosed embodiments are not intended to be exhaustive or limit the invention to the precise forms disclosed in the detailed description. While the present invention has been described as having exemplary designs, the present invention can be further modified within the spirit and scope of this disclosure. Further, this application is intended to cover such departures from the present disclosure as come within known or customary practice in the art to which this invention pertains.

What is claimed is:

1. A hermetically sealed package for an optical media disk, comprising:

an oxygen impermeable base;

an oxygen impermeable cover layer superposed on said base, said cover layer having an outer margin and a central portion;

an enclosing chamber for the disk defined by said central portion of said cover layer; and a circular seal portion formed when said cover layer is sealed to said base, said circular seal portion defining a periphery of said enclosing chamber.

2. The package of claim 1, wherein the package includes an aperture extended through said base and said cover layer, said aperture located outside of said periphery of said enclosing chamber.

3. The package of claim 1, further comprising at least one stiffening beam comprised of said base and said cover layer sealed together, said stiffening beam spaced apart from said enclosing chamber.

4. The package of claim 3, wherein said at least one stiffening beam comprises a heat seal.

5. The package of claim 3, wherein said at least one stiffening beam is formed along edge portions of said base and said cover layer.

6. The package of claim 5, wherein said at least one stiffening beam comprises a heat seal.

7. The package of claim 1, wherein at least one of said cover layer and said base includes oxygen scavenger material.

8. The package of claim 1, wherein the package is substantially rectangular and includes stiffening beams along each edge thereof.

9. A hermetically sealed package for an optical media disk, comprising:

an oxygen impermeable base;

an oxygen impermeable cover layer superposed on said base, said cover layer having an outer margin and a central portion;

an enclosing chamber defined by said central portion of said cover layer;

a circular seal portion formed when said cover layer is sealed to said base, said circular seal defining a periphery of the enclosing chamber; and an optical disk disposed in said enclosing chamber, said periphery of said chamber is at or closely spaced from an outer periphery of said disk to minimize volume of said chamber not occupied by disk.

10. The package of claim 9, wherein the package includes an aperture extended through said base and said cover layer, said aperture located outside of said periphery of said enclosing chamber.

11. The package of claim 9, further comprising at least one stiffening beam comprised of said base and said cover layer sealed together, said stiffening beam spaced apart from said enclosing chamber.

12. The package of claim 11, wherein said at least one stiffening beam comprises a heat seal.

13. The package of claim 11, wherein said at least one stiffening beam is formed along edge portions of said base and said cover layer.

14. The package of claim 13, wherein said at least one stiffening beam comprises a heat seal.

15. The package of claim 9, wherein at least one of said cover layer and said base includes oxygen scavenger material.

16. The package of claim 9, wherein the package is substantially rectangular and includes stiffening beams along each edge thereof.

17. A hermetically sealed package for an optical media information carrier, comprising;

an oxygen impermeable base;

an oxygen impermeable cover layer superposed on said base, said cover layer having an outer margin and a central portion;

an enclosing chamber for the carrier defined by said central portion of said cover layer;

a circular seal portion formed when said cover layer is sealed to said base, said circular seal portion defining a periphery of the enclosing chamber; and an optical media information carrier disposed in said enclosing chamber, said periphery of said chamber is closely spaced from an outer periphery of said carrier to minimize volume of said chamber not occupied by said carrier.

* * * * *